United States Patent
Tokhtuev et al.

(10) Patent No.: US 7,049,602 B2
(45) Date of Patent: May 23, 2006

(54) RADIATION SENSOR

(76) Inventors: Eugene Tokhtuev, 2001 Jefferson St., Duluth, MN (US) 55812; Viktor Slobodyan, 5702 Juniata St., Duluth, MN (US) 55804; Anatoly Skirda, 4348 Joey Dr., Duluth, MN (US) 55811; Christopher J. Owen, 219 W. Fifth St., Duluth, MN (US) 55806; Jose A. Goin, 2822 E. 1st St., Duluth, MN (US) 55812; Christopher A. Buck, 1220 N. Central Ave., Duluth, MN (US) 55807

( * ) Notice: Subject to any disclaimer, the term of this patent is extended or adjusted under 35 U.S.C. 154(b) by 351 days.

(21) Appl. No.: 10/629,754

(22) Filed: Jul. 30, 2003

(65) Prior Publication Data

US 2004/0021087 A1     Feb. 5, 2004

Related U.S. Application Data

(60) Provisional application No. 60/399,436, filed on Jul. 31, 2002.

(51) Int. Cl.
*G01J 1/42*     (2006.01)
*G02B 26/00*   (2006.01)
*G02B 6/00*    (2006.01)

(52) U.S. Cl. ............. 250/372; 359/290; 385/140
(58) Field of Classification Search .......... 250/372; 356/310; 359/236, 350, 361, 290, 291; 385/140
See application file for complete search history.

(56) References Cited

U.S. PATENT DOCUMENTS

| | | | |
|---|---|---|---|
| 4,825,078 A * | 4/1989 | Huber et al. | 250/372 |
| 5,382,799 A * | 1/1995 | May | 250/372 |
| 5,497,004 A | 3/1996 | Rudolph et al. | |
| 5,514,871 A * | 5/1996 | Hayes et al. | 250/372 |
| 6,167,185 A | 12/2000 | Smiley et al. | |
| 6,188,063 B1 * | 2/2001 | Schroeder | 250/239 |
| 6,239,435 B1 * | 5/2001 | Castleman | 250/339.15 |
| 6,278,120 B1 * | 8/2001 | May | 250/372 |
| 6,292,616 B1 | 9/2001 | Tei et al. | |
| 6,351,329 B1 | 2/2002 | Greywall | |
| 6,404,970 B1 | 6/2002 | Grandson et al. | |

OTHER PUBLICATIONS

Alex Ryer, "The Light Measurement Handbook", Copyright 1997, pp. 1-63.

* cited by examiner

Primary Examiner—David Porta
Assistant Examiner—Frederick F. Rosenberger
(74) Attorney, Agent, or Firm—Reed Smith LLP; Stanley P. Fisher, Esq.; Juan Carlos A. Marquez, Esq.

(57) ABSTRACT

The invention provides a radiation sensor including a housing, an attenuator with at least one cavity for attenuating optical radiation, and a detector, as well as an optical attenuator including an attenuator body, an entrance with one multi-stage input opening or plural input openings, and means for transferring radiation inside of the attenuator body and then to a detector. The invention further provides methods for using the radiation sensor or the optical attenuator.

40 Claims, 16 Drawing Sheets

RADIATION SENSOR

BACKGROUND OF THE INVENTION

This application claims the benefit of U.S. Provisional Patent Applications Ser. No. 60/399,436 filed on Jul. 31, 2002, the entire disclosures of which are incorporated herein by reference.

TECHNICAL FIELD

The invention relates generally to radiation sensors and, more particularly, to a UV radiometer that includes a collection unit with an attenuator having an entrance with one multi-stage input opening or plural input openings, or with at least one cavity for attenuating optical radiation, a detector and electronics to measure UV dose and UV irradiance applied to products and materials in a UV curing system or in other UV exposure systems.

BACKGROUND OF INVENTION AND DESCRIPTION OF PRIOR ART

In measuring of UV or other light irradiance and cumulative dose inside of UV chambers as well as in UV curing systems or in any UV emitting environment as from an output of UV light guides, the performance and efficiency of, e.g., a UV curing system, can be distorted due to contamination and degradation of UV lamps.

In the prior art, several UV radiometers have been developed for portable and stationary devices. U.S. Pat. No. 5,514,871 and U.S. Pat. No. 6,278,120 describes radiation sensors for measuring levels of ultraviolet intensity. They were developed for measuring high intensity radiation and have similar design for optical attenuation, which result in a large overall size because several optical elements are needed to be placed in a linear fashion, i.e., with a detector immediately following an attenuation device and directed toward a radiation source. U.S. Pat. No. 5,382,799 describes a radiation sensor for measuring levels of ultraviolet intensity which has a smaller size of the attenuator but the attenuation device requires several distinct parts, such as a diffuser window, one or more Teflon® diffusers, an aperture plate separated from the Teflon® diffuser by an O-ring, a cut glass filter, a spacer, etc., which result in challenges for reproducibility of the desired attenuation. U.S. Pat. No. 5,497,004 describes a radiation sensor with an attenuator made of a quartz glass. This sensor requires one or several discrete steps of attenuation conducted via complex elements, such as a dispersive element comprises a quartz glass having interior boundary surfaces, and an optical filter for visible light, to achieve appropriate attenuation.

There are several variants of optical attenuators described in the U.S. Pat. No. 6,167,185, U.S. Pat. No. 6,351,329, U.S. Pat. No. 6,292,616, U.S. Pat. No. 6,404,970, which share the same deficiencies as described previously.

There is a need for a compact radiation sensor with high radiation tolerance and less frequent calibration to maintain and monitor the level of UV irradiation and dose received from the light emitting device and level of exposure to the materials inside an exposure unit.

SUMMARY OF INVENTION

It is an object of the present invention to improve optical sensor designs for measuring UV radiation, especially with in a UV curing system.

It is another object of the present invention to improve the performance of radiation sensors using an attenuator with a high level of attenuation, which protects the UV detector from degradation after exposure of the radiation sensor to high doses of UV radiation.

It is a further object of the present invention to provide a way for ease of calibration of the sensor during manufacturing and subsequent calibration efforts.

It is also an object of the present invention to improve radiation sensor tolerance and extend a time period between calibration using information about temperature and total accumulated dose during the sensor operation.

Other objects and advantages of the present invention may be seen from the following detailed description In accordance with the present invention, the radiation sensor has multiple attenuators to receive a high level of attenuation, a small sized detector unit and allows for ease of adjustment for the sensitivity of different detectors. Preferably, the radiation sensor has a multi-cavity attenuator, which has inside means for adjusting and filtering radiation. The radiation sensor has a micro controller, which allows for correcting an output signal if it is affected by detector aging, optical part solarization or temperature.

The radiation sensor, according to the present invention, includes one or more simple and efficient filters made of plastic plates for correction of the spectral sensitivity of different photodiodes used therein.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DETAILED DESCRIPTION OF THE INVENTION

Figure 1:
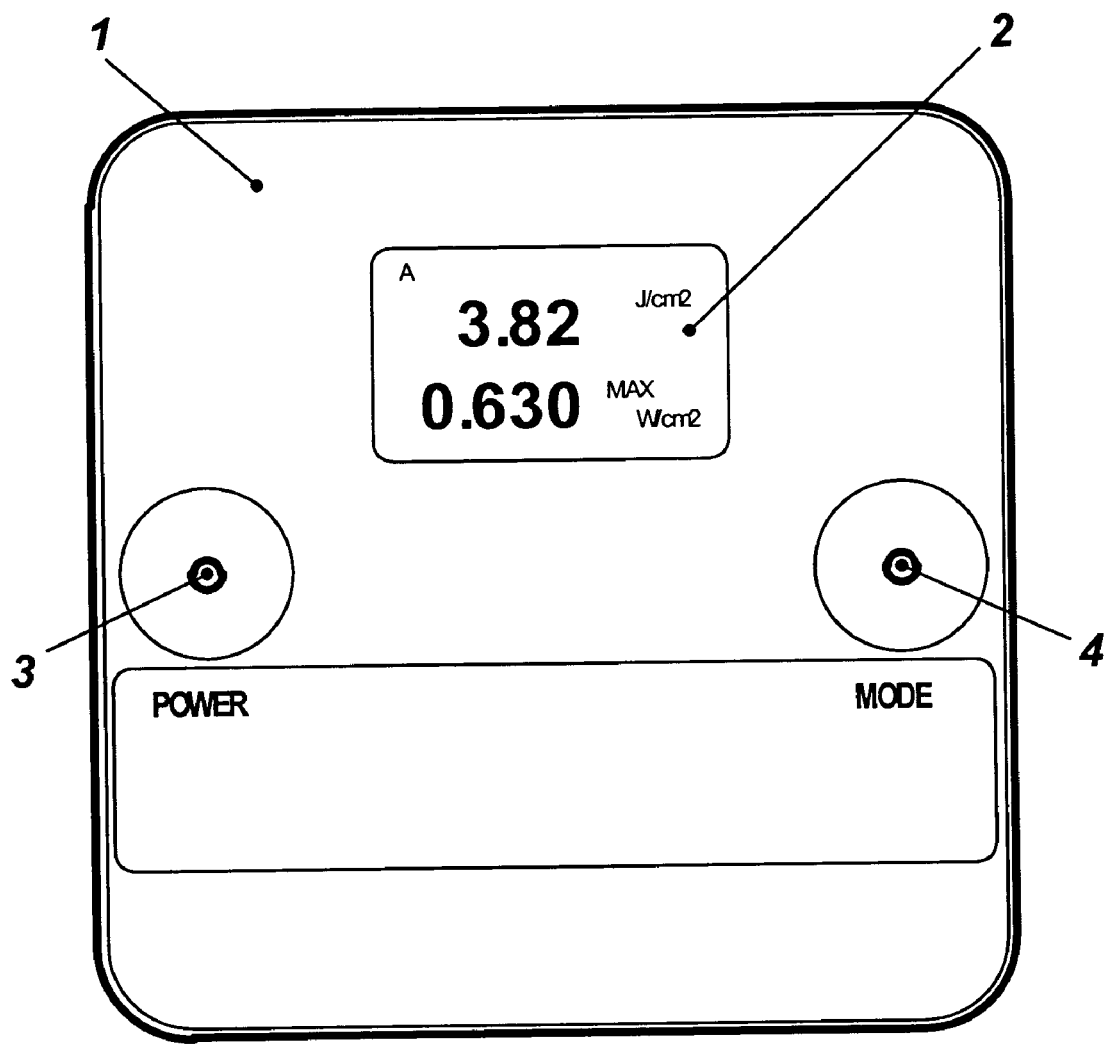
FIG. 1 shows the front view of one embodiment of an assembled radiation sensor with a multi-cavity attenuator according to the present invention.
Figure 2A:
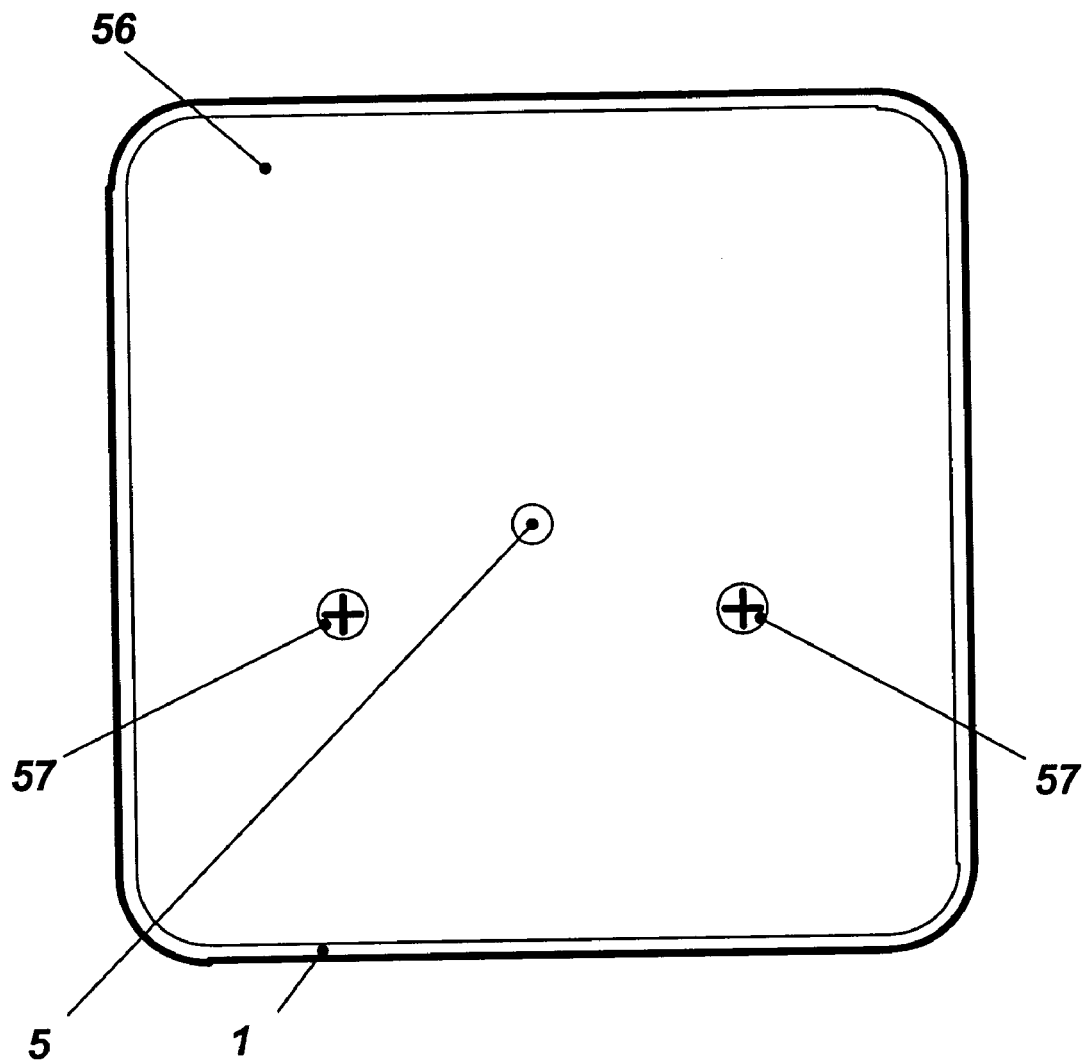
FIG. 2A shows the back view with a closed lid of the embodiment of a radiation sensor depicted in FIG. 1.
Figure 2B:
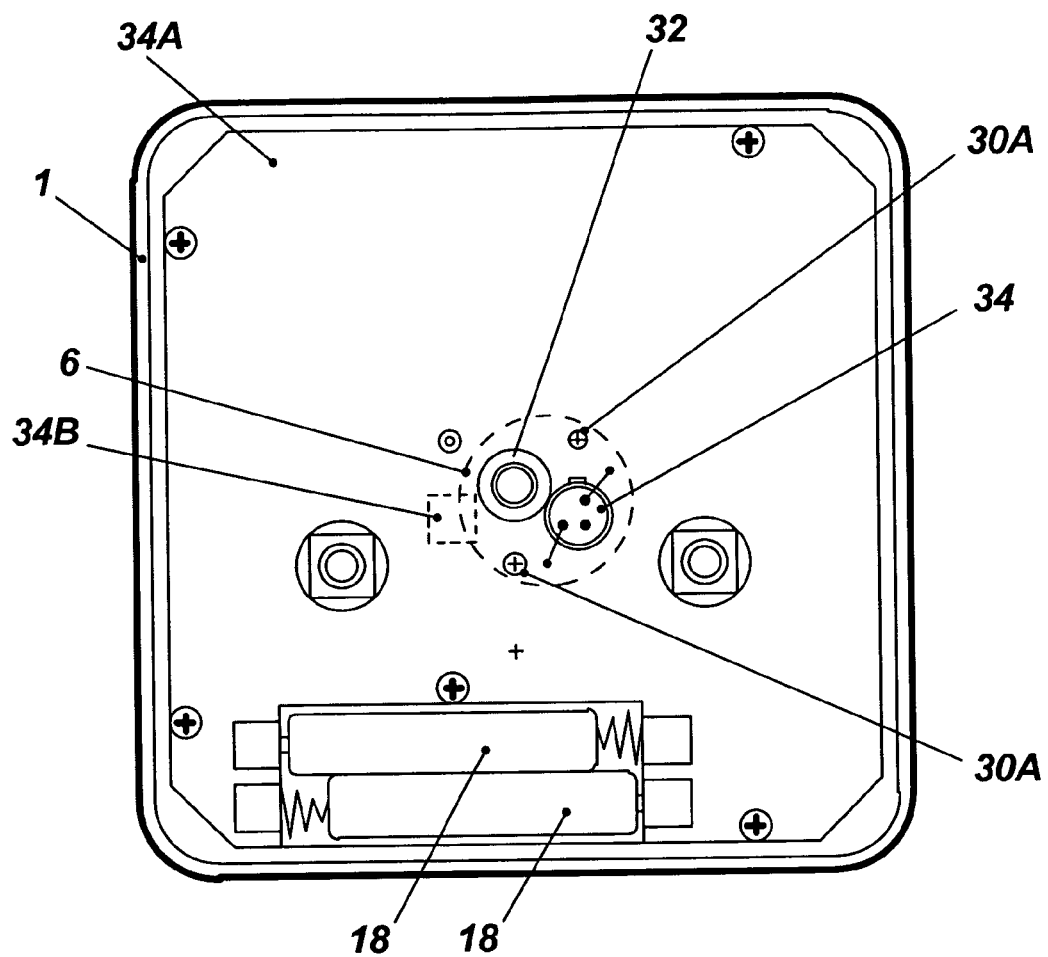
FIG. 2B shows the back view of one embodiment of an open lid of the embodiment of a radiation sensor depicted in FIG. 1.
Figure 2C:
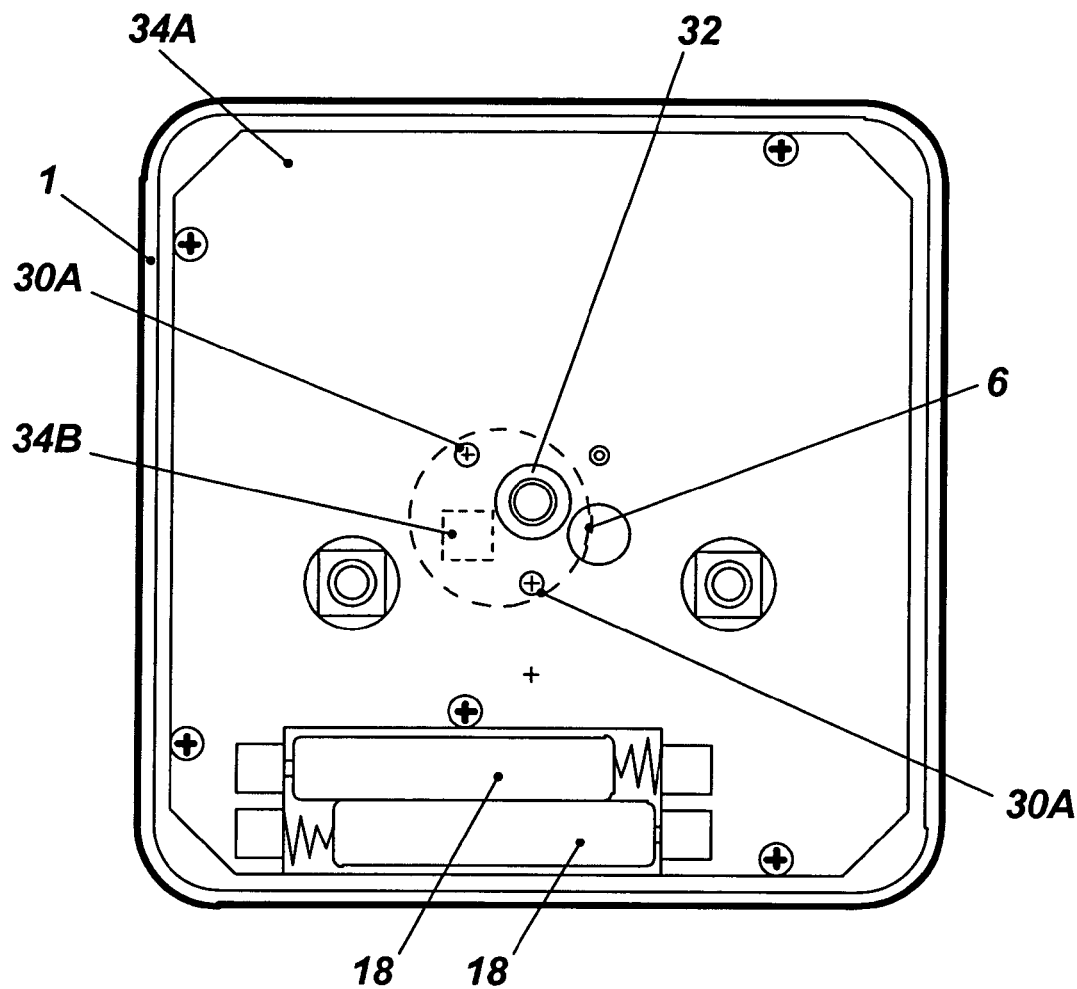
FIG. 2C shows the back view of another embodiment of an open lid of the embodiment of a radiation sensor depicted in FIG. 1 reconfigured to work with a surface mount photodiode.

A radiation sensor according to the present invention is an optical electronic device for measuring UV irradiance from high intensity UV sources. One of the embodiments of the radiation sensor optimized for using in UV curing chambers comprises a housing, a housing lid, an attenuator, a detector, a preamplifier, an amplifier, a controller with an analog to digital converter, one or several push buttons, memory, a display, batteries and a power supply. The front view of the radiation sensor is shown in FIG. 1. A housing 1 has a display 2 and a Power button 3 and a Mode button 4. The back view of the radiation sensor is shown in FIG. 2A. The housing 1 has dimensions of 100 mm×100 mm×12 mm and is closed with a lid 56. There is a thermo isolative material under the lid that protects any electronics inside from excessive heat during operation. The lid 56 is secured with screws 57 and has a window 5. The view of the radiation sensor without lid is shown in FIG. 2B. The housing 1 holds a printed circuit board 34A and batteries 18. The printed circuit board 34A has an opening in the center with an adjustable insert 32. The opposite side of the adjustable insert 32 is fixed inside of an attenuator 6. The attenuator 6 is shown with a thin line as it is located under the printed circuit board 34A and secured with screws 30A through holes in the printed circuit board 34A. A photodiode 34 is inserted in the attenuator 6 through another opening on the printed circuit board 34A. The printed circuit board 34A has a reserved place for soldering a surface mount photodiode 34B. As the embodiment shown in FIG. 2C, the printed circuit board 34A has only the photodiode 34B installed thereon. To work with the photodiode 34B the same attenuator 6 is rotated around the insert 32 and secured with screws 30A in a second position as shown in FIG. 2C. For some embodiments, both photodiodes 34, 34B are installed and the attenuator is modified to have one first cavity and two secondary cavities associated with both photodiode 34, 34B. The photodiode 34 or the surface mounted photodiode 34B can be a silicon carbide UV A, UV B, or UV C photodiode, a GaAsP UV photodiode, an AlGaN UV photodiode, and a GaN UV photodiode.

The radiation sensor, according to the present invention, can work with one or several photodiodes having a traditional package or surface mount package. The embodiment with several photodiodes allows receiving information about irradiance in several spectral ranges.

Figure 3:
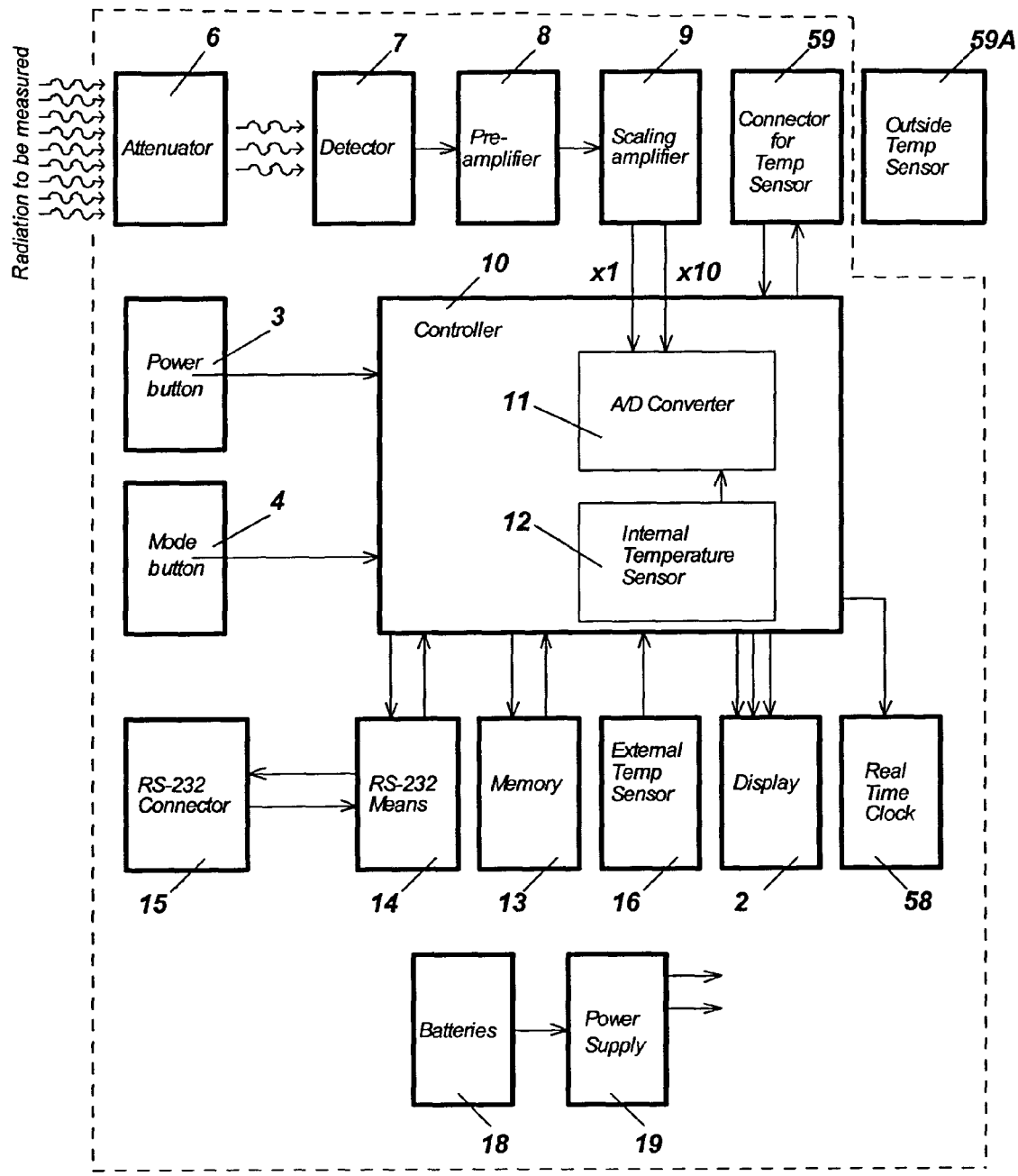
FIG. 3 snows a schematic diagram of one embodiment of a radiation sensor according to the present invention.

The schematic diagram of the radiation sensor according to the present invention is shown in FIG. 3. The radiation sensor has an attenuator 6, a detector 7(e.g., a photodiode), a preamplifier 8, a scaling amplifier 9, a controller 10 with an analog to digital converter 11 and an internal temperature sensor 12, a Power pushbutton 3, a Mode pushbutton 4, a memory 13, a RS-232 means 14, a RS-232 connector 15, an external temperature sensor 16, a digital display 2, batteries 18, a power supply 19, a real time clock 58, etc. There is a connector 59 reserved for connecting an outside temperature sensor 59A to be placed outside of the radiation sensor to measure an actual temperature inside of a UV chamber.

Figure 4:
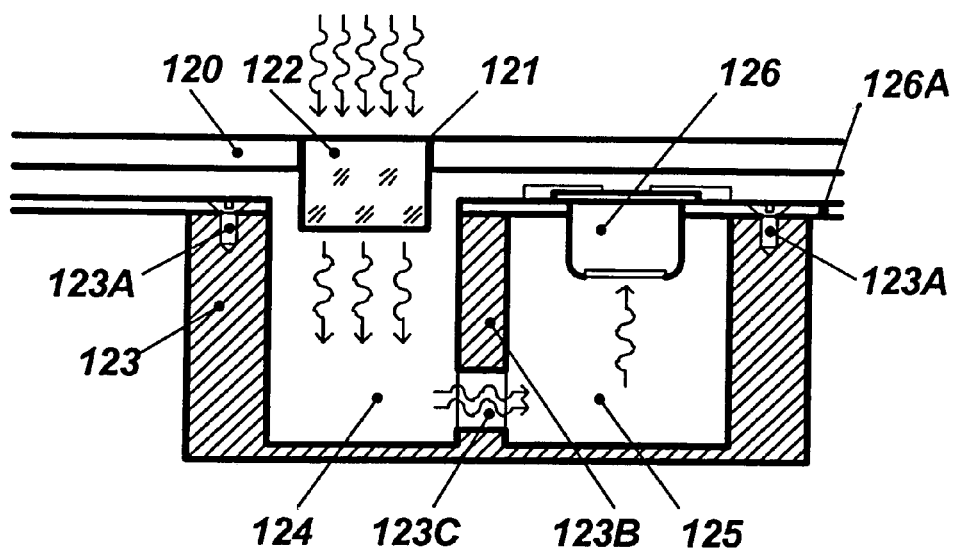
FIG. 4 shows a multi-cavity attenuator with a detector according to the present invention.

The design of a multi-cavity attenuator, according to the present invention, is shown in FIG. 4. The lid 120 has an entrance aperture 121 (diameter of 3 mm) with a window 122. The printed circuit board 126A has a hole under the window 122 to let light enter inside of the first cavity 124 (a cylindrical hole with a 5 mm diameter and a 7.5 mm depth) of an attenuator body 123 made of fluoropolymer or metal (such as aluminum or stainless steel) to scatter and redirect the light inside the first cavity 124. The window 122 comprises a sapphire plate which has extremely high resistance to scratching. For some embodiments the window 122 is made as a positive lens to correct a spatial response of a radiation sensor. The attenuator body 123 is attached to the printed circuit board 126A with screws 123A and has a second cavity 125 (a cylindrical hole with a 8.5 diameter and a 7.5 mm depth), which directs scattered and attenuated light to a photodiode 126. The internal surface of the first and second cavities comprises a machined surface of fluoropolymer or metal without any reflective or absorptive coatings. In case of a metal attenuator body, the machined surface is preferably polished to provide multiple reflection with low attenuation after each reflection. The radiation entered into the first cavity 124 is reflected, scattered and redirected therein, and only portion of it (less than 1%) enters into the second cavity 125. There is a hole 123C (diameter of 2 mm) in the wall 123B (of 2 mm thick) between the first cavity 124 and the second cavity 125. The radiation entered into the second cavity 125 is reflected, scattered and redirected therein such that it is again attenuated in more than 200 times. The size of the hole 123C is chosen to obtain an appropriate total attenuation of attenuator because the amount of radiation that pass from the first cavity into the second cavity is approximately proportional to the surface area of the hole 123C. Such a multi-cavity design provides of attenuator with a high level of attenuation and a small size so as to reduce the size of a radiation sensor comprising the attenuator.

The invention provides a compact, stable, resistant to high level of irradiance sensor which can be easily expanded to have many UV ranges. For example, one central cavity with input window can be surrounded with several (2, 3, 4, 5, 6 . . . ) cavities having photodetectors with different UV ranges.

Prior art radiation detectors do not use cavity to attenuate radiation. Usually, the walls of the prior art cavity walls do not reflect light, such as being made black or having a size and orientation that the radiation follows from an inlet to a filter or a diffuser and to output as a collimated beam. On the other hand, the invention is designed with cavity walls of a high reflection rate such that the radiation hits walls many times.

Figure 5A:
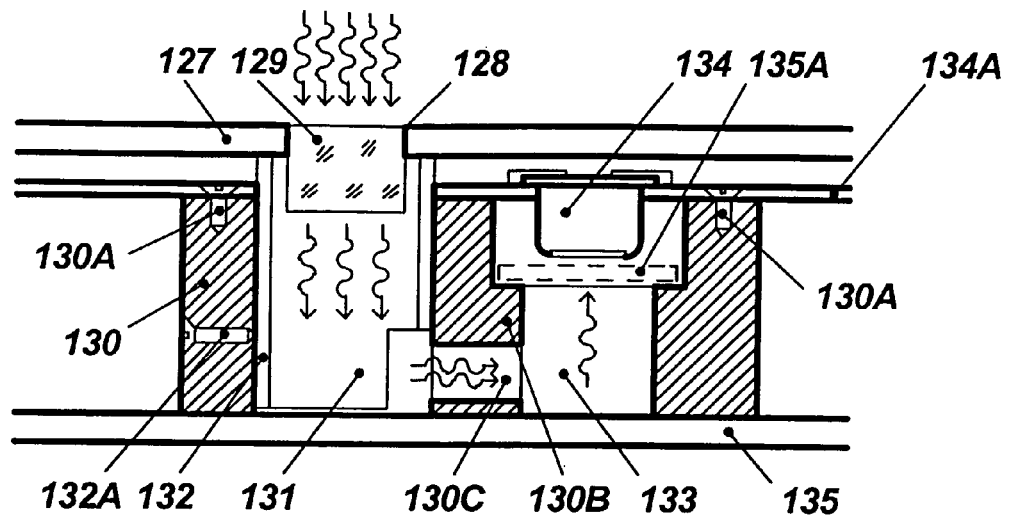
FIG. 5A shows an adjustable multi-cavity attenuator with a detector according to the present invention.
Figure 9A:
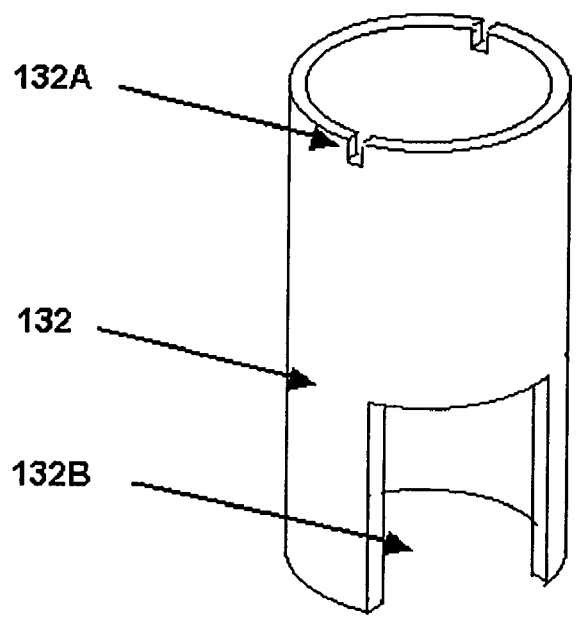
FIG. 9A shows a perspective view of the adjustable insert depicted in FIG. 5A.

An adjustable attenuator with a detector is shown in FIG. 5A. The lid 127 has an entrance aperture 128 (diameter of 3 mm) with a window 129. The printed circuit board 134A has a hole under the window 129 to let light enter inside of the first cavity 131 of an attenuator body 130. The attenuator body 130 is attached to the printed circuit board 134A with screws 130A and has a second cavity 133, which directs scattered and attenuated light to the photodiode 134. An optical filter 135A is placed in front the photodiode 134. There is a hole 130C in the wall 130B between the first cavity 131 and the second cavity 133. The first cavity 131 (a cylindrical hole with a 5 mm diameter and a 7.5 mm depth) has an adjustable insert 132 made as a brass tube polished inside and having an outside diameter 5 mm, an inner diameter 4 mm, and a 7.5 mm length. The adjustable insert 132 can be moved to change the open area of the hole 130C to obtain an appropriate total attenuation of attenuator. FIG. 9A shows a perspective view of the adjustable insert 132. The adjustable insert 132 has two notches 132A on its upper end to rotate the insert with a screwdriver for an adjustment. On its lower end, it has a cut segment 1 32B. By orientating the adjustable insert 132 differently relative to the hole 130C, different amount of radiation will pass from the first cavity 124 into the second cavity 125. In this embodiment, the interior surface of the insert 132 works as reflective surface of the first cavity 124. After adjustment, the insert 132 is secured with a screw 132A. The multi-cavity attenuator with such an adjustable insert operates in a much broader range of UV irradiance (e.g., from 100 W/cm2 to 0.5 W/cm2) and measures more accurately. For example, radiation sensors with maximum range 10 W/cm2 and 1 W/cm2 need different attenuation to bring an output signal from the photodiode into the optimal range in which the photodiode works lineally and without saturation.

Figure 5B:
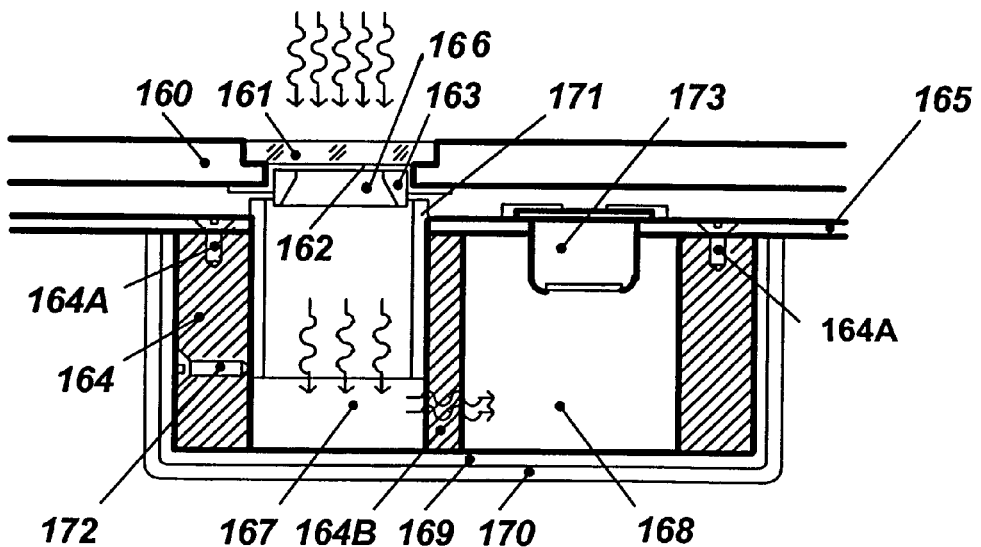
FIG. 5B shows a multi-cavity attenuator with an improved cosine response according to the present invention.
Figure 9B:
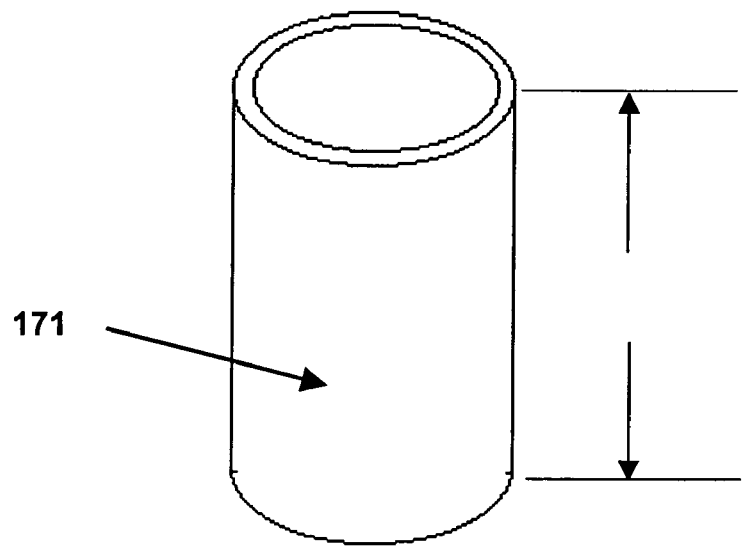
FIG. 9B shows a perspective view of the insert depicted in FIG. 5B.
Figure 10:
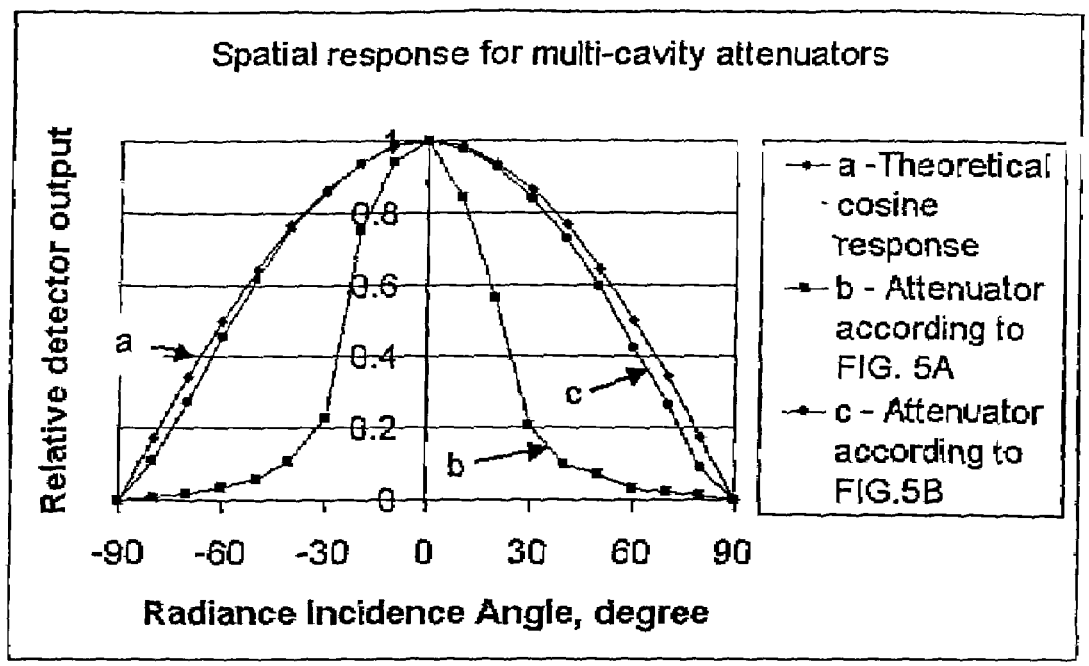
FIG. 10 shows a spatial response of the multi-cavity attenuators depicted in FIG. 5A and FIG. 5B.

The effects of a radiance incidence angle on a detector output is very important for many applications where light sources are different for calibration and for real measurements. An ideal irradiance detector has an angular response, which can be described as a cosine function of the angle of incidence. The proximity of the measured angular response to the theoretical cosine function shows the quality of a detector. The example of a theoretical cosine response in Polar and Cartesian Coordinates are shown in the International Light Measurement Handbook published by International Light, Inc. (Newburyport, Mass.) A multi-cavity attenuator with an improved cosine response is shown in FIG. 5B. The lid 160 has a window 161. A fluoropolymer tape 162 (e.g., a white PTFE tape according to Mil.Spec.T-27730A, minimum of 99% Polytetrafluoroethylene, made by McMaster-Carr, Chicago, Ill.) is secured a sapphire plate 166 to the window 161 with a washer 163. The sapphire plate 166 has a first portion with a diameter approximately equal to a diameter of a hole of the lid 161 and a second portion with a diameter smaller than the diameter of the hole of the lid 161. The printed circuit board 165 has a hole under the window 161 to let light enter inside of the first cavity 167 (a cylinder with a 5 mm diameter and a 7.5 mm deep) of an attenuator body 164 made of a fluoropolymer. The fluoropolymer has no absorption in visible and UV range and it is temperature resistant. It has white color and provides good diffuse reflection. The attenuator body 164 is attached to the printed circuit board 165 with screws 164A and has a second cavity 168 (a cylinder of a 8.5 mm diameter and a 7.5 mm deep) which directs scattered and attenuated light to the photodiode 173. The UV radiation from the first cavity 167 penetrates to the second cavity 168 through the semi transparable wall 164B of 0.2–5 mm thick between them. The first cavity 167 has an insert 171 made as a brass tube polished inside. The insert 171 has an outside diameter 5 mm, an inner diameter 4 mm, and a 5 mm length. The insert is secured with a screw 172. FIG. 9B shows a perspective view of the insert 171. The length of the insert 171 and the thickness of the wall 1 64B between the cavities are chosen to obtain an appropriate total attenuation of attenuator. The attenuator body 164 is wrapped with a layer of another fluoropolymer tape 169 and then with a layer of aluminum foil 170. The fluoropolymer tape 19 and the aluminum foil 170 increase uniformity of a UV light field inside the first cavity and the second cavity to protect the fluoropolimer body from contamination and mechanical stress. The multi-cavity attenuator with a fluoropolimer tape directly under the window has a spatial response close to cosine as shown in FIG. 10.

Figure 5C:
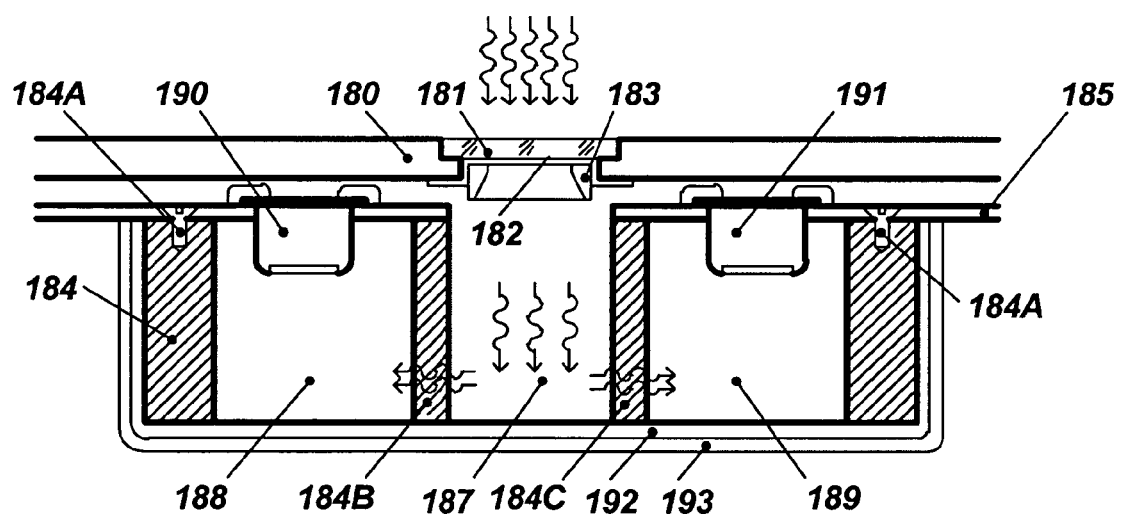
FIG. 5C shows a multi-cavity attenuator with more than one secondary cavity according to the present invention

Another embodiment of a multi-cavity attenuator with more than one secondary cavity is shown in FIG. 5C. The lid 180 has a window 181. A fluoropolymer tape 182 is secured near the window 181 with a washer 183. The printed circuit board 185 has a hole under the window 181 to let light enter inside of the first cavity 187 (a cylinder with a 5 mm diameter and a 7.5 mm deep) of an attenuator body 184 made of a fluoropolymer. The attenuator body 184 is attached to the printed circuit board 185 with screws 184A and has two secondary cavities 188, 189 (cylindrical holes of a 5 mm diameter and a 7.5 mm deep) which directs scattered and attenuated light to photodiodes 190 and 191 having different spectral ranges of sensitivity. The UV radiation from the first cavity 187 penetrates to both of the secondary cavities 188, 189 through the semi transparable wall 184B and 184C of 0.2–5 mm thick between them. The attenuator body 184 is wrapped with a layer of another fluoropolymer tape 192 and then with a layer of aluminum foil 193. The photodiodes 190, 191 connected to an electrical schematic and work simultaneously to provide data about the irradiance in two different spectral ranges. In other embodiments, a multi-cavity attenuator has several secondary cavities therein, e.g. four secondary cavities connected to the front, back, right and left sides of the first cavity, each of which is associated with one respective photodiode, one respective optical filter or plastic correction filter. A radiation sensor with such embodiments measures irradiance in all spectral ranges important for specific application. In other embodiments, more than four small diameter secondary cavities are associated with the first cavity.

Figure 6:
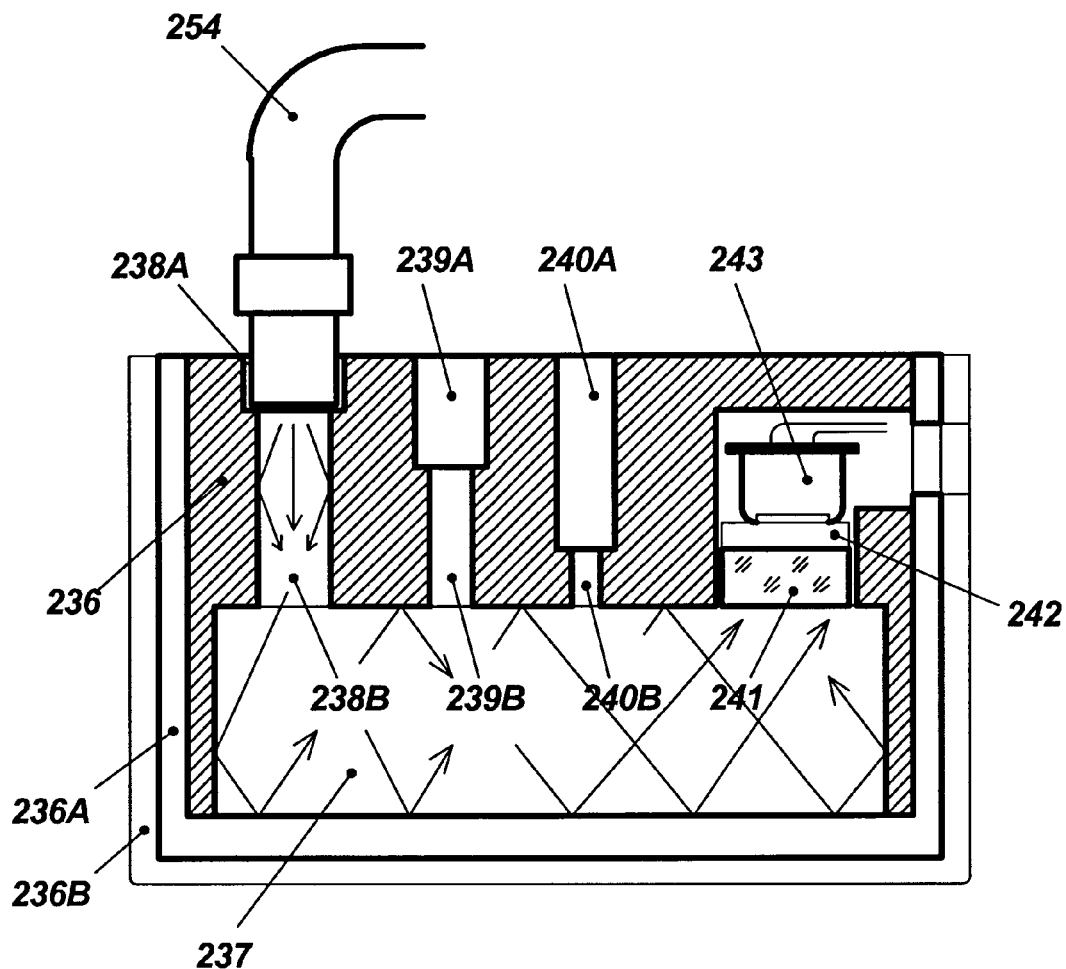
FIG. 6 shows an embodiment of a UV sensor for sensing radiation density (irradiance) from different light guides according to the present invention.

One embodiment of a UV sensor with an attenuator for measuring of the irradiance from UV light guides is shown in FIG. 6. An attenuator body 236 is made of metal and covered with a layer of a fluoropolimer tape 236A and an aluminum foil 236B. The attenuator body 236 has a main cavity 237, several channels for inserting light guides with different diameters. Each channel has a beginning bigger diameter(e.g., 238A, 239A, 240A ) equal to the outer diameter of a corresponding light guide, for example 10 mm, 7 mm and 5 mm, to accommodate light guides with optical diameters of 8 mm, 5 mm and 3 mm respectively. Another section of each channel has a diameter slightly smaller (e.g., 238B, 239B, 240B) than outer diameter of the light guide, for example 9 mm, 6 mm and 4 mm, so as not to restrict radiation from the light guides of 8 mm, 5 mm and 3 mm. The channel parts 238B, 239B, 240B are made with a polished surface and serve as a first cavity of a multi-cavity attenuator. The radiation enters the channel parts 238B, 239B, 240B from the light guide. For example, an 8 mm light guide 254 is shown. The radiation gets first attenuation after reflection and scattering inside of the channel and through the end of the channel then enters into the main cavity 237. Walls of the main cavity 237 reflects and scatters the radiation and deliver it to the UV photodiode 243 placed in a mortise of the attenuator body 236. For some embodiments without enough attenuation, there is a scattering device 241 (with a 12 mm diameter) made of (1) an opal glass or a fluoropolimer film and (2) a UV long pass filter, which corrects a spectral range of UV photodiode 243 to have a specified spectral sensitivity.

An embodiment of a UV sensor with a multi-cavity attenuator for measuring of the irradiance from different UV light guides is shown in FIG. 7. An attenuator body 244 is made of metal and has a variable diameter channel 244A having a 5 mm length of a 5 mm diameter, a 7.5 mm length of a 7 mm diameter, and a 7.5 mm length of a 10 mm diameter and a main cavity 244B (a cylinder with a 4 mm length and a 15 mm diameter). A photodiode cover 245 has an opal glass insert 246 and a printed circuit board 249 with a photodiode 248. The photodiode cover 245 and the printed circuit board 249 are attached to the attenuator body 244 with screws 250 and 251. The variable diameter channel 244A provides stable fixation for accommodating light guides with different diameters. FIG. 7B shows the UV radiation sensor with a 3 mm light guide 252 inserted in the channel of the attenuator body 244. FIG. 7C shows the UV radiation sensor with a 5 mm light guide 252 inserted in the channel of the attenuator body 244. FIG. 7D shows the UV radiation sensor with a 8 mm light guide 252 inserted in the channel of the attenuator body 244. The attenuator body 244 has a polished internal surface in the main cavity 244B and on the first two smaller diameter portions of the variable diameter channel 244A. As shown in FIG. 7B, for the 3 mm light guide, only one section of the main cavity serves as an attenuator. For the 5 mm light guide, two sections of the main cavity serve as an attenuator, and for the 8 mm light guide, three sections of the main cavity serve as an attenuator The depth of each step in the variable diameter channel is chosen to provide an appropriate attenuation for each diameter of a corresponding light guide. Such a UV radiation sensor with a variable diameter light guide channel and with several stages of attenuation as a single or multi-cavity attenuator, opal glass, a fluoropolymer film provides portable and efficient sensor for main industrial devices with UV light guides.

The attenuator design according to the invention also works for visible light or other wave length. The ones for UV A, UV B, UV C, visible, or their combination are used as examples. The dimensions for visible light or other wave length can be two times less or three times more.

Figure 8:
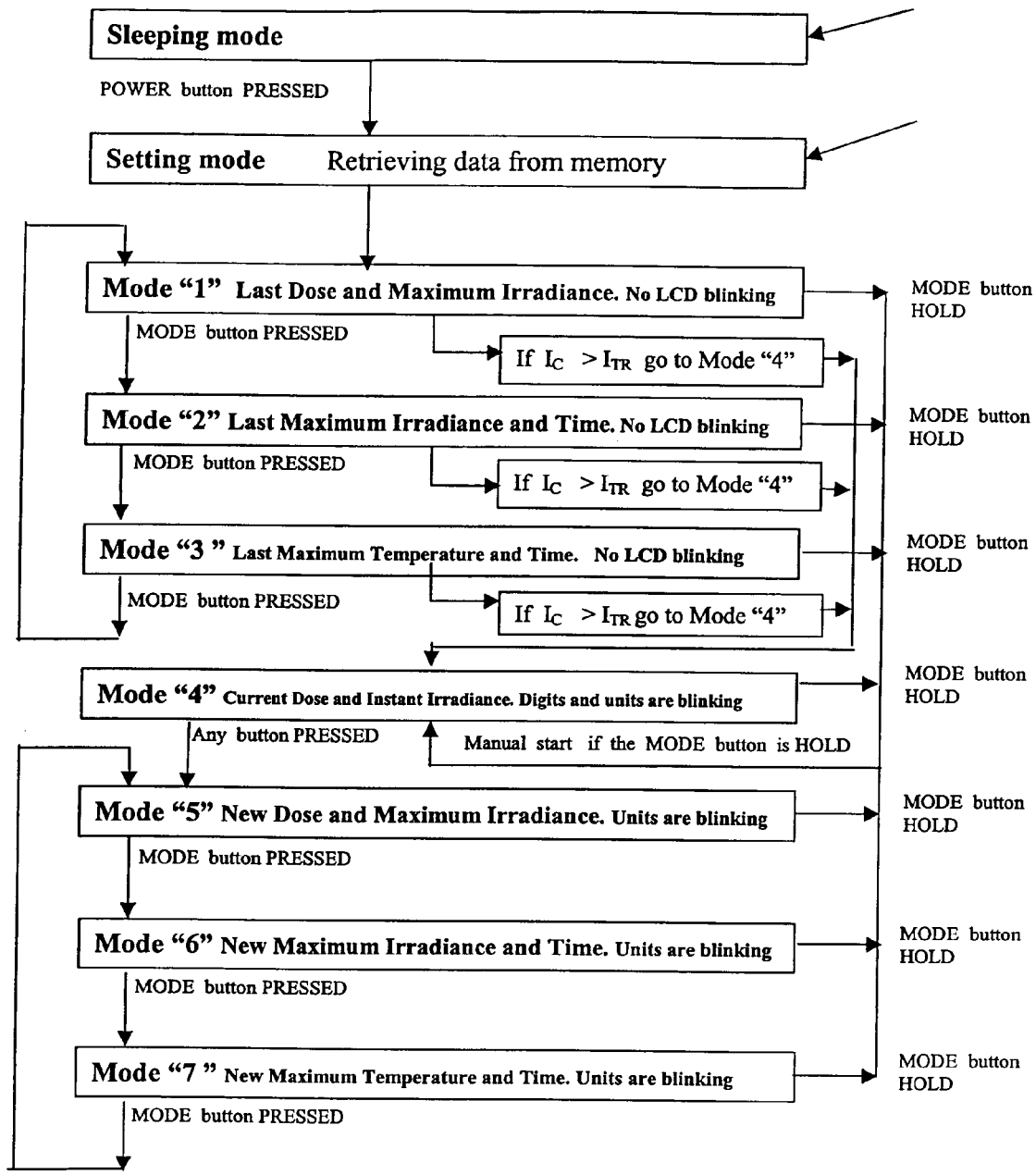
FIG. 8 shows an operation sequence of a radiation detector according to the present invention.

An operation sequence of a radiation detector according to the present invention is shown in FIG. 8. At the beginning the radiation detector is in a Sleeping mode 101. After the POWER button 3 (see FIG. 3) is pressed a Setting mode 102 is activated and the controller 10 checks a voltage of batteries 18 and retrieves data of the last run of the measurements from the memory 13. If the battery voltage is lower than a limit, a warning LOW BATTERY will be shown at the display 2. After the Setting mode 102 is done, the display 2 works in Mode "1" in which the results of the last measurement from the memory 13 are shown on the display 2. In FIG. 1, the first line of the display shows the total dose in Joules per Centimeter Square (e.g., 3.82 J/cm$^2$) and the second line shows the maximum irradiance during last run in Watts per Centimeter Square (e.g., 0.630 W/cm$^2$). After pressing the MODE button 4 the display 2 is switched from the Mode "1" into the Mode "2". In the Mode "2," the display 2 shows the maximum irradiance during the last run in Watts per Centimeter Square and time in seconds for the time when this maximum irradiance was detected. Pressing the MODE button 4 again, the display 2 is switched from the Mode "2" into the Mode "3". In the Mode "3," the display 2 shows the maximum temperature during the last run in degrees of Celsius and time in seconds for the time when this maximum temperature was detected. Pressing the MODE button 4 again returns the display 2 into the Mode "1". If digits and units of measurement on the display 2 during the Modes "1", "2" and "3" are not blinking, the data on the display are taken from the memory 13. During the Modes "1", "2" and "3," the analog to digital converter (A/D converter) 11 in the controller 10 (see FIG. 3) periodically measures outputs of the scaling amplifier 9 to check for the presence of UV radiation.

If the level of UV irradiance $I_C$ exceeds a threshold $I_{TR}$ ($I_C$>$I_{TR}$), the controller 10 automatically starts the Mode "4". In this mode, the controller 10 constantly measures the outputs of the scaling amplifier 9 with the amplified output (×10). If the amplified output comes close to saturation, the controller 10 uses non-amplified output (×1). Using of two outputs increases the dynamic range of the radiation detector and allows measuring irradiance from 20 W/cm$^2$ to 0.001 W/cm$^2$. The controller 10 continuously integrates irradiance data to find a cumulative dose from the beginning of the current run and shows results of current measurement on the display 2. The first line of the display shows the dose in Joules per Centimeter Square and the second line shows the current irradiance during last run in Watts per Centimeter Square. Digits and units of measurement on the display during the modes "4" are blinking, that serves an indication that data on the display are results of running measurements. The controller 10 operates with the real time clock 58 and continuously saves in the memory 13 all data about the dose, the maximum irradiance together with time stamped data about momentarily levels of irradiance and temperature from temperature sensors.

In the Mode "4," if the POWER button 3 or the MODE button 4 is pressed, the controller 10 stops running measurements, saves new data in the memory 13, renew data about total cumulative dose measured since the last calibration, and activates the Mode "5" in which the results of the new measurement are shown on the display 2. The first line of the display shows the total dose in Joules per Centimeter Square and the second line shows the maximum irradiance during new run in Watts per Centimeter Square. After pressing the MODE button 4, the display 2 is switched from the Mode "5" into the Mode "6". In the Mode "5," the display 2 shows the maximum irradiance during new run in Watts per Centimeter Square and time in seconds for the time when this maximum irradiance was detected. By pressing the MODE button 4 again, the display 2 is switched from the Mode "6" into the Mode "7". In the Mode "7," the display 2 shows the maximum temperature during a new run in degrees of Celsius and time in seconds for the time when this maximum temperature was detected. By pressing the MODE button 4 again, the display 2 is returned into the Mode "5". In the Modes "5", "6" and "7," digits on display are not blinking and units of measurement are blinking, that serves an indication that data on the display are results of the new run. To start manually a new run of measurements during any mode of operation the MODE button 4 should be pressed and hold. To turn off the radiation sensor during any mode of operation, the POWER button 3 should be pressed and hold.

The detector can be adjusted and calibrated such that a certain irradiance signal should give a predetermined current. The detector is adjusted and calibrated by using regulate means to transfer maximum radiation, putting a light guide with a standard known irradiance (which is measured with an independent calibrated sensor), reading an output of the radiation detector, and using the regulate means to transfer radiation to have a predetermined output signal. Accordingly, the detector is calibrated and ready for measurement. It has a specified sensitivity and an output current under the maximum irradiance which will not exceed allowed a current limit.

The radiation sensor according the present invention has a RS-232 means 14 comprising a RS-232 line driver and a RS-232 connector 15. Any calibration information can be verified and corrected directly from a computer through a RS-232 port. After the radiation sensor finishes a current measurement, the RS-232 port is used to download an irradiance and temperature profile from the memory 13.

The controller 10 also measures temperature signals from an internal temperature sensor 12, an external temperature sensor 16, and an outside temperature sensor 59A that can be connected to the connector 59. The internal temperature sensor 12 is a part of the controller 10 and monitors the controller temperature. The external temperature sensor 16 monitors the temperature in the radiation sensor housing near the UV detector. Those two sensors are used to start a sound signal if either temperature comes close to the safe limit and to turn off the power supply 19 if either temperature exceeds the set level to protect electronics. The controller 10 uses data from the external temperature sensor 16 to apply correction factors to the current readings of the A/D converter so as to compensate for a zero shift and a variation of sensitivity of the detector 7, the preamplifier 8 and the scaling amplifier 9. Compensation coefficients are stored in the memory 13 for continuously correcting the irradiance measurements during operation.

Figure 11:
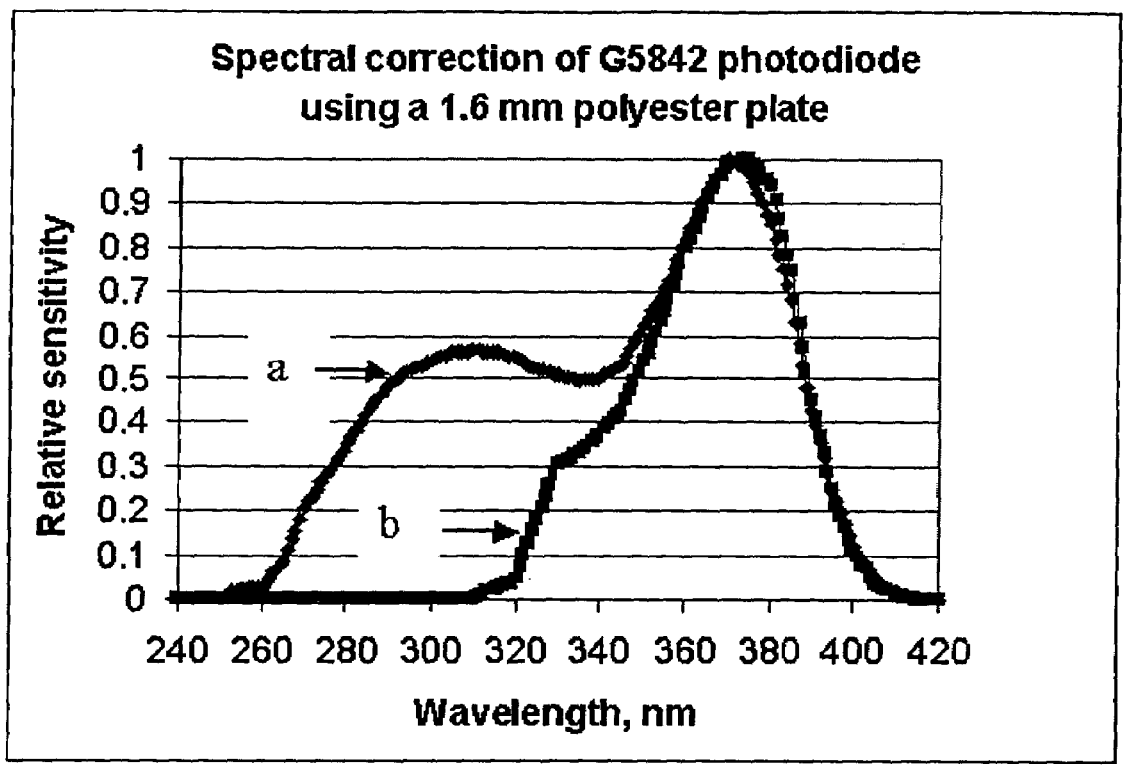
FIG. 11 shows a spectral correction of G5842 photodiode using a 1.6 mm polyester plate.

In some embodiments, the radiation sensor has an optical filter 135A inside of the attenuator 130 (see FIG. 5A) to correct a spectral sensitivity of the photodiode 134. For example a cheap GaAsP UV photodiode Model No. G5842 made by Hamamatsu Photonics K.K. (Shizuoka Pref., 430-8587, Japan) has a spectral response range from 260 nm to 400 nm and cannot be used as sensor for the UV A range without spectral correction with a long pass filter. A glass or interference optical filter can be used but they are expensive and usually have big dimensions. According to the present invention, a small polyester plate with thickness of 1 m to 4 mm can be used together with the GaAsP G5842 photodiode to detect light of 320 nm to 400 nm that corresponds to the UV A range. FIG. 11 shows a spectral correction of a G5842 photodiode using a 1.6 mm polyester plate. A detector sensitivity for each specific wavelength is defined as a ratio of the detector output signal (e.g. output current for photodiodes) to irradiance level at the detector input, assuming that only narrow band radiation of this specific wavelength is present. Relative sensitivity for each wavelength is defined as a ratio of the detector sensitivity for this wavelength to the maximum detector sensitivity. The curve "a" shows the relative sensitivity of the G5842 photodiode without correction. The curve "b" shows the relative sensitivity of the photodiode with an additional 1.6 mm polyester plate for correction. The polyester plate absorbs radiation with a wavelength shorter than 320 nm forming consequently a sensitivity that corresponds to the UV A range (320–400 nm). Under the UV radiation, the polyester plate gradually changes transmission. The lifetime of the detector with the polyester long pass filter can be extended with a correction coefficient applied to the results of current measurements. The radiation sensor, after each run, renews data about the total cumulative dose measured after last calibration and the controller 10 applies a correction factor to compensate for variation in the detector sensitivity. Same correction methods are used if the detector changes its sensitivity after exposure to the UV radiation.

Figure 12:
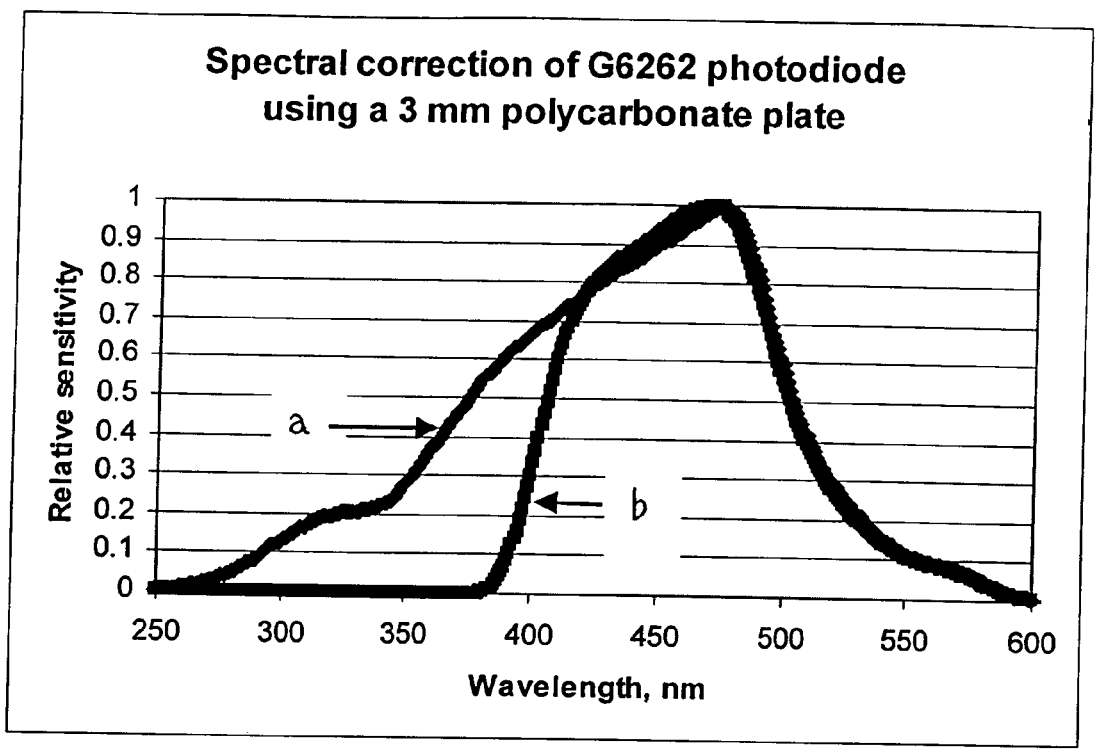
FIG. 12 shows a spectral correction of G6262 photodiode using a 3 mm polycarbonate plate.

In some embodiments, the radiation sensor uses a cheap GaAsP photodiode G6262 by Hamamatsu with a spectral response range from 300 nm to 580 nm. The spectral response of the photodiode can be corrected with a long pass filter to make a detector for a visible light. FIG. 12 shows a spectral correction of a G6262 photodiode using a 3 mm polycarbonate plate. The curve "a" shows the relative sensitivity of the G6262 photodiode without correction. The curve "b" shows the relative sensitivity of the photodiode with an additional 3 mm polycarbonate plate for correction. The polycarbonate plate absorbs radiation with wavelength shorter than 320 nm forming consequently a sensitivity that corresponds to the visible light range (400–580 nm). A glass or interference optical filter can be used, but they are expensive and usually have big dimensions. According to the present invention, a small polycarbonate plate with thickness of 1 m to 4 mm can be used together with the GaAsP G6262 photodiode to detect light of 400 nm to 580 nm.

Both embodiments in FIGS. 11–12 described above use a cheap photodiode together with a small cheap plastic plate inside of the second cavity of the multi-cavity attenuator to form the spectral curve "b". This solution provide a cheap, compact and reliable alternative to an expensive silicon carbide photodiode (SiC) which has an internal interference optical filter for UV A and to a bulky silicon (Si) photodiode with a glass or external interference optical filter. The outside temperature sensor 59A is optionally connected to the connector 59. The outside temperature sensor 59A may be a microchip digital temperature sensor, e.g., Model No. LM 74 made by National Semiconductor (Santa Clara, Calif.) The temperature sensor 59A is located on the small printed circuit board and protected from direct UV light with an aluminum foil. The aluminum foil serves as substrate for materials used in UV curing procedure, such as paint, glue or compound. The radiation sensor with the outside temperature sensor 59A provides information of a real temperature profile that is very important for optimization of the technological procedure since the efficiency of the UV activation can be different for different temperatures and real temperature varies for different optical properties of the materials used. The outside temperature sensor 59A may be made as a disposable unit to be replaced with a new sensor after each run or can be made as printed circuit board with the sensor having a disposable aluminum cover.

The radiation sensor according to the present invention is especially efficient for measuring high levels of UV irradiance in UV A, UV B and UV C ranges. It operates up to 20 W/cm$^2$ in UV A and UV B ranges and to 2 W/cm$^2$ in UV C and visible ranges. Such levels of irradiance are present in some UV curing equipment and at the output of some UV illuminating systems with UV light guides. The embodiment in FIG. 6 is optimized for using with UV light guides having different diameters. One of light guides is inserted in a channel that corresponds its diameter. Light from the UV light guide enters the main cavity 237 through the cylindrical channels 238B, 239B or 240B. Each of the cylindrical channels 238A, 239A or 240A has a different depth of an enlarged diameter so as to stop the end of the light guide at the different distance from the channel end. After initial scattering and reflection in a cavity between a light guide end and an end of the cylindrical channel, the radiation enters main cavity 237. After the scattering and reflection in main cavity 237, the radiation is additionally attenuated with the scattering device 241 and passes through the UV long pass filter 242 to the detector 243. The lengths and positions of the channels 238B, 239B, 240B are chosen to obtain on the photodiode 243 an irradiance level corresponding to the irradiance level at the outputs of the respective light guide. For example, if the light guides deliver light beams to an identical UV power but with different cross sections, the irradiance is inversely proportional to the surface of the cross section. Therefore, the channel for the light guide with a bigger diameter is made longer and placed at the bigger distance from the photo detector 243.

Figure 7A:
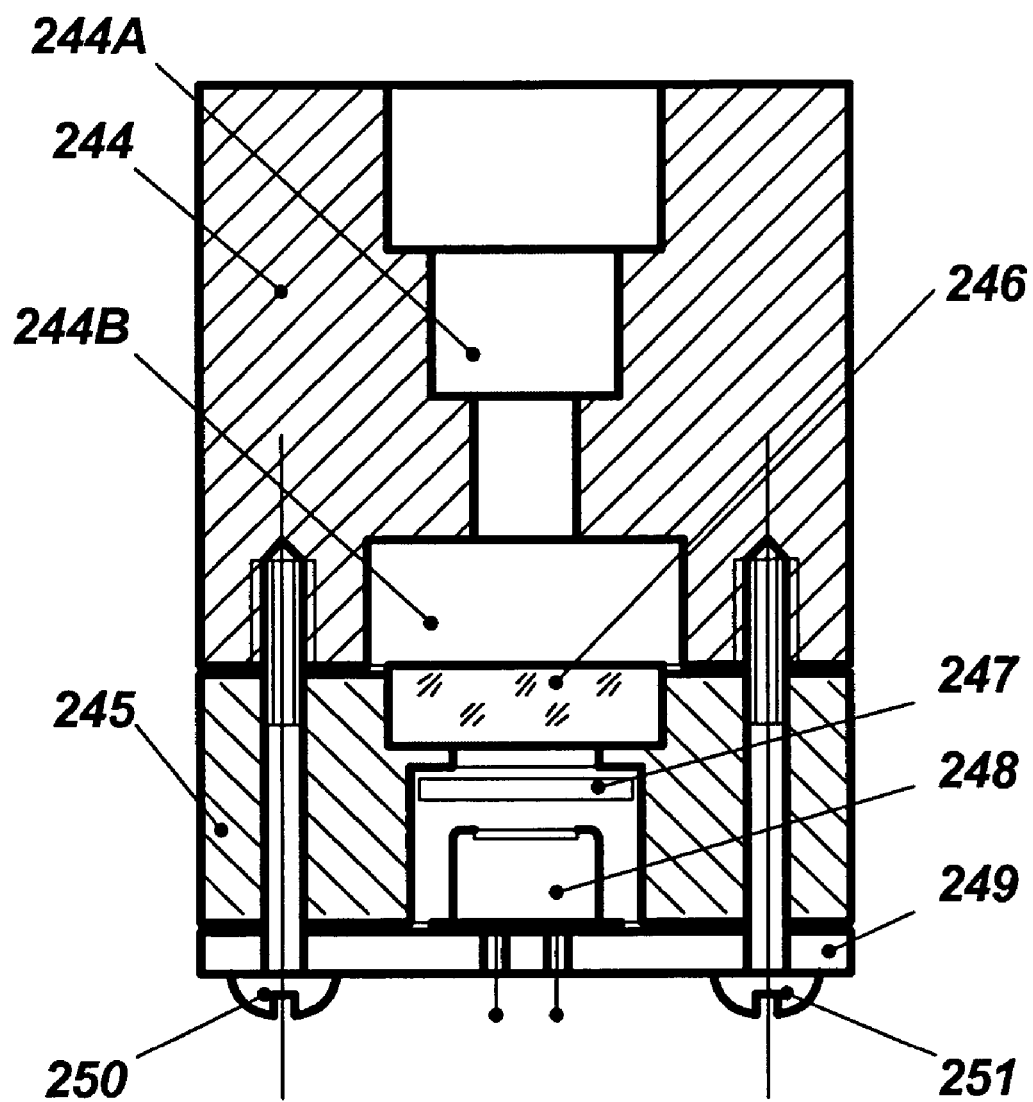
FIG. 7A shows another embodiment of a UV sensor for sensing radiation density (irradiance) from different light guides according to the present invention.
Figure 7D:
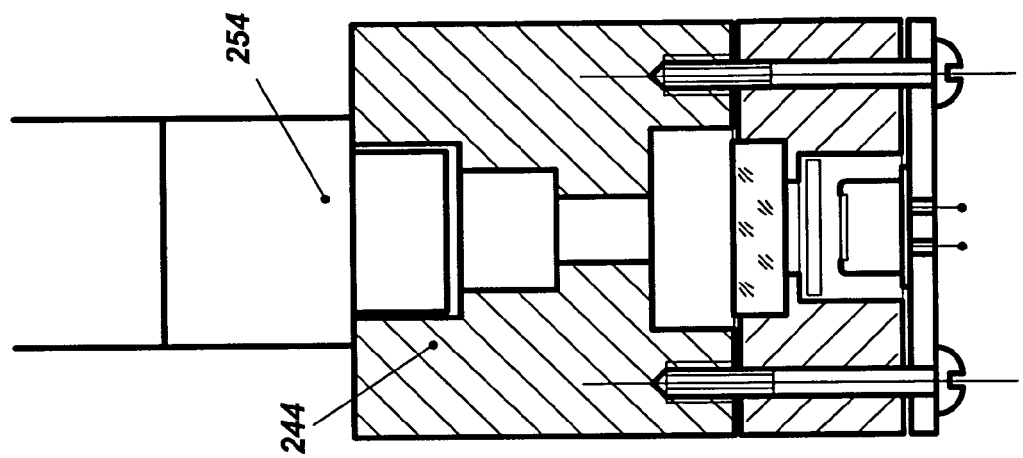
FIG. 7D shows a UV sensor according to the present invention with an inserted 8 mm light guide.
Figure 7C:
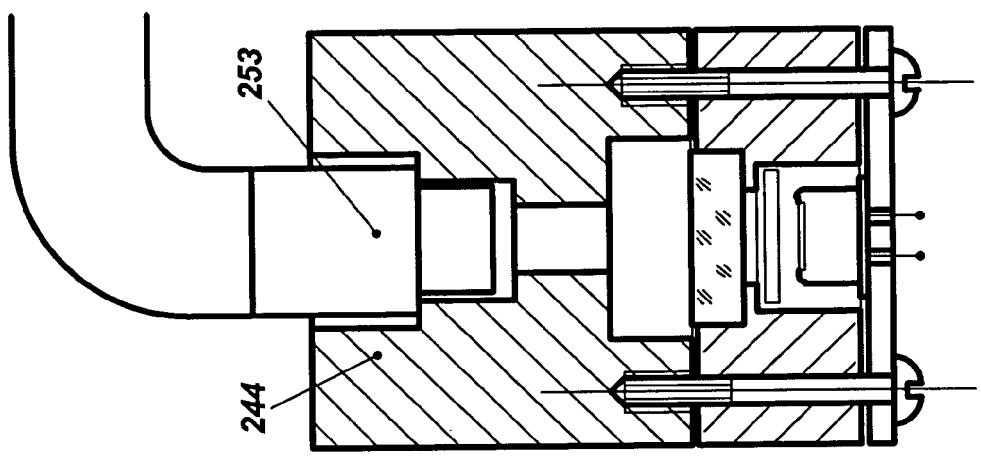
FIG. 7C shows a UV sensor according to the present invention with an inserted 5 mm light guide.
Figure 7B:
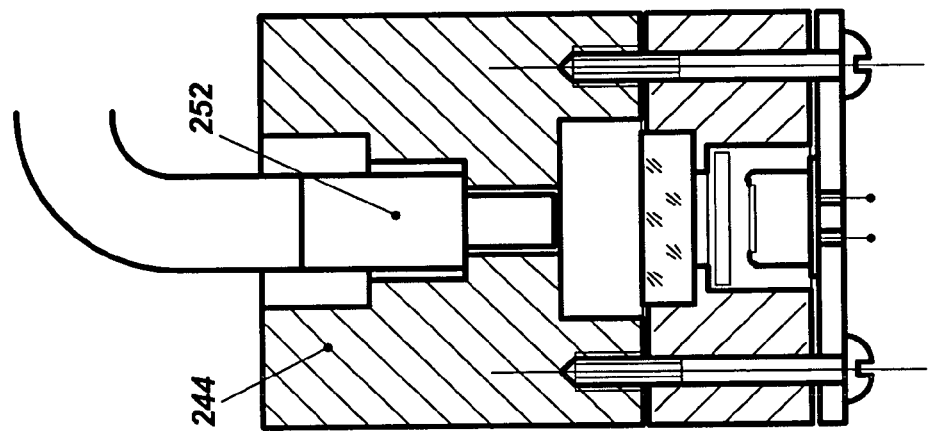
FIG. 7B shows a UV sensor according to the present invention with an inserted 3 mm light guide.

A more compact embodiment for a UV sensor with a light guide holder is shown in FIG. 7A, which works in a similar way. The attenuator body 244 has a main cavity 244A and a cylindrical channel with sections of different diameters 244B. FIG. 7B shows a UV sensor with inserted 3 mm light guide. FIG. 7C shows a UV sensor with inserted 5 mm light guide. FIG. 7D shows a UV sensor with inserted 8 mm light guide. Light from the UV light guide enters the cylindrical channel. After initial scattering and reflection in the channel, the radiation enters the main cavity 244A. After the scattering and reflection in main cavity 244A, the radiation is additionally attenuated with the opal glass 246 and passes through a fluoropolimer film 247 to the photodiode 248. The length of the parts with different diameters are chosen to obtain on the photodiode 248 an irradiance level that corresponds to the irradiance level at the outputs of the light guides.

The principles, preferred embodiments and modes of operation of the present invention have been described in the foregoing specification by taking UV as an example. However, the invention, which is intended to be protected, is not limited to the particular light or embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

What is claimed is:

1. A radiation sensor comprising:
   a housing, an attenuator with at least one cavity for attenuating optical radiation, and at least one UV detector,
   wherein a window of the housing for receiving external radiation and the detector are located on an identical side of the attenuator, and
   said attenuator has several cavities and means for transferring radiation from a first cavity to at least one secondary cavity inside of the attenuator.

2. The radiation sensor as claimed in claim 1, wherein the housing has a housing lid having an aperture for receiving the window of the housing.

3. The radiation sensor as claimed in claim 2, wherein said window comprises a sapphire plate.

4. The radiation sensor as claimed in claim 3, wherein said sapphire plate has a first portion with a diameter approximately equal to a diameter of the aperture of the lid and a second portion with a diameter smaller than the diameter of the aperture of the lid.

5. The radiation sensor as claimed in claim 2, wherein said window comprises a sapphire positive lens.

6. The radiation sensor as claimed in claim 1, wherein each of the secondary cavities directs scattered and attenuated light to a respective detector therein with a different spectral range of sensitivity.

7. The radiation sensor as claimed in claim 1, wherein said means for transferring radiation includes a semi transparent part of the attenuator.

8. The radiation sensor as claimed in claim 1, wherein said means for transferring radiation includes an opening between the first and secondary cavities in the attenuator.

9. The radiation sensor as claimed in claim 1, wherein said attenuator has a body made of fluoropolymer or metal, and the first cavity has an opening adjacent to the window of the housing, and the secondary cavity has an opening adjacent to the detector.

10. The radiation sensor as claimed in claim 9, wherein said means for transferring radiation includes a semi transparent part of the attenuator body.

11. The radiation sensor as claimed in claim 9, wherein said means for transferring radiation includes an opening between the first and secondary cavities in the attenuator body.

12. The radiation sensor as claimed in claim 9, wherein each of the first and secondary cavities is cylindrical, and wherein an opening adjacent to the window of the housing and an opening adjacent to the detector are located on the same side of the attenuator.

13. The radiation sensor as claimed in claim 1, wherein a RS-232 means and RS-232 connector are placed in said housing.

14. The radiation sensor as claimed in claim 1, wherein said detector comprises at least one of a silicon carbide UV A photodiode, a silicon carbide UV B photodiode, a silicon carbide UV C photodiode, a GaAsP (UV A+B) photodiode, a GaAsP (UV+visible) photodiode, an AlGaN UV photodiode, and a GaN UV photodiode.

15. The radiation sensor as claimed in claim 1, wherein a UV Long Pass Filter is placed inside the secondary cavity and in front of said detector.

16. The radiation sensor as claimed in claim 15, wherein the UV Long Pass Filter comprises a polyester plate, and said detector comprises a GaAsP UV A+B photodiode.

17. The radiation sensor as claimed in claim 16, wherein said polyester plate is 1 mm to 4 mm thick.

18. The radiation sensor as claimed in claim 15, wherein the UV Long Pass Filter comprises a polycarbonate plate, and said detector comprises a GaAsP photodiode for a visible light range.

19. The radiation sensor as claimed in claim 18, wherein said polycarbonate plate is 1 mm to 4 mm thick.

20. The radiation sensor according to claim 1, wherein the detector accommodates an average signal with a maximum regulation to give a current not more than 1.0 mA for maximum irradiance on the input.

21. The radiation sensor according to claim 1, further comprising a temperature sensor.

22. The radiation sensor according to claim 1, further comprising a preamplifier, an amplifier, and a controller with an analog to digital converter.

23. The radiation sensor according to claim 1, further comprising one or several push buttons, memory, and a display.

24. A radiation sensor comprising:
   a housing, an attenuator with at least one cavity for attenuating optical radiation, and a detector,
   wherein said attenuator has several cavities and means for transferring radiation from a first cavity to at least one secondary cavity inside of the attenuator,
   said attenuator has a body made of fluoropolymer or metal, and the first cavity has an opening adjacent to the window, and the secondary cavity has an opening adjacent to the detector, and a moveable cylindrical insert is placed inside the first cavity to adjust the amount of radiation passing from the first cavity to the secondary cavity.

25. A radiation sensor, comprising:

a housing;

at least one UV detector; and an attenuator with one light scattering cavity for attenuating optical radiation and at least two channels each connected with the light scattering cavity, wherein said channels include a first channel for receiving a first light guide, and a second channel for receiving a second light guide, and the detector and windows of the housing for receiving external radiation into the light guides are located on an identical side of the attenuator.

26. The method of sensing UV radiation comprising the steps of:

providing a UV detector and a radiation attenuator with at least two cavities for attenuating optical radiation and means for transferring radiation from a first cavity to at least one secondary cavity inside of the attenuator;

adjusting said means for transferring radiation to have a predetermined level of radiation on a sensing area of the detector; and detecting an attenuated radiation with the detector.

27. The method of sensing UV radiation according to the claim 26, further comprising the steps of:

providing a temperature sensor to measure a detector temperature;

measuring and storing a total accumulative dose of radiation measured by the detector since last calibration; and correcting the detector due to aging caused by the total accumulative dose and the detector temperature.

28. The method of sensing UV radiation according to the claim 27, further comprising a step of displaying a result after the correcting step.

29. The method of sensing UV radiation according to the claim 26, wherein the adjusting step involves adjusting and calibrating the detector to accommodate an average signal with a maximum regulation to give a predetermined current.

30. The method of sensing UV radiation according to the claim 26, further comprising a step of optically filtering an attenuated radiation with a plastic plate.

31. A radiation sensor comprising:

a housing with a window for receiving external radiation thereinto, an attenuator with at least two cavities for attenuating optical radiation, and a detector, wherein said two cavities are arranged side by side in a direction parallel with a receiving surface of the window.

32. An optical attenuator comprising:

an attenuator body with at least one cavity for attenuating optical radiation, said cavity having an entrance with one multi-stage input opening or plural input openings; and means for transferring radiation inside of the attenuator body and then to an external detector.

33. The optical attenuator as claimed in claim 32, wherein said means for transferring radiation includes a semi transparent part of the attenuator body.

34. The optical attenuator as claimed in claim 32, wherein said means for transferring radiation including an opening between a first cavity and at least one secondary cavity in the attenuator body.

35. The optical attenuator as claimed in claim 34, wherein each of the secondary cavities directs scattered and attenuated light to a respective detector with a different spectral range of sensitivity.

36. The optical attenuator as claimed in claim 35, wherein each of the first and secondary cavities is cylindrical, and said input opening with the window and said output opening towards the detector are located on the same side of the attenuator body.

37. The optical attenuator as claimed in claim 35, wherein a moveable cylindrical insert is placed inside the first cavity to adjust the amount of radiation passing from the first cavity to the secondary cavity.

38. The optical attenuator as claimed in claim 34, wherein said attenuator body is made of fluoropolymer or metal, the first cavity has an input opening with a window, and the secondary cavity has an output opening towards the detector.

39. The optical attenuator as claimed in claim 32, wherein each of said plural input openings has a different diameter to accept radiation guides of different diameters to bring a radiation inside the entrance cavity.

40. The optical attenuator as claimed in claim 32, wherein the multi-stage input opening has sections of different diameters along an optical path therein to accommodate radiation guides having different diameters.

* * * * *